3,595,937
Patented July 27, 1971

3,595,937
THERMOPLASTIC POLYESTER MOULDING COMPOSITIONS CONTAINING POLYACETALS
Klaus Weissermel, Kelkheim, Taunus, Karlheinz Burg, Hofheim, Taunus, and Harald Cherdron, Wiesbaden, Germany, assignors to Farbwerke Hoechst Aktiengesellschaft vormals Meister Lucius & Brüning, Frankfurt am Main, Germany
No Drawing. Filed Sept. 23, 1968, Ser. No. 761,807
Claims priority, application Germany, Oct. 11, 1967,
P 16 94 204.4
Int. Cl. C08c 11/32; C08g 39/10, 51/18
U.S. Cl. 260—860                                    21 Claims

ABSTRACT OF THE DISCLOSURE

Thermoplastic moulding compositions comprising a linear saturated polyester and polyacetals, from which shaped articles can be made having a good surface hardness and a high impact strength and bending strength.

---

The present invention relates to novel thermoplastic polyester moulding compositions having improved properties.

It has been proposed to mould polyester moulding compositions containing linear saturated polyesters of aromatic dicarboxylic acids into crystalline shaped articles. Polyethylene terephthalate, for example, can be injection moulded into shaped articles the crystallization speed and crystallization degree of which can be influenced by the addition of suitable nucleating agents. The shaped articles obtained in this manner have only a moderate impact strength.

It has also been proposed to mix polyesters with polypropylene or poly-4-methylpentene-1, whereby moulding compositions having an improved dimensional stability are obtained.

The present invention provides thermoplastic moulding compositions comprising a mixture of (a) linear saturated polyesters of aromatic dicarboxylic acids and optionally small amounts of aliphatic dicarboxylic acids, with saturated aliphatic or cycloaliphatic diols and (b) polyacetals in an amount of from 0.1 to 25 and preferably 0.5 to 10% by weight, calculated on the total mixture, which moulding compositions have excellent properties.

It is surprising that the impact strength of the modified polyesters is improved without the hardness and abrasion resistance being detrimentally affected.

Nucleating agents may be added to the moulding compositions according to the invention, which agents are known to increase the speed of crystallization of the polyester composition and ensure that the polyester shaped articles reach a good degree of crystallization. Shaped articles having a good degree of crystallization are dimensionally stable also at a temperature above the second order transition temperature and do not shrink. Finely divided inorganic substances which are insoluble in the polyester moulding composition, for example calcium carbonate, aluminum silicate or talc may be used as nucleating agents in known manner. They can be added to the moulding compositions at various stages of the manufacturing process. For example, the nucleating agent may be added during the manufacture of the starting polyester or in the course of the polycondensation. Alternatively, the nucleating agent may be mixed with the polyester together with the polyacetal. Still further, it is possible to mix the granulated polyester moulding composition with the nucleating agent in a rotating drum and optionally fuse the mixture in an extruder, extrude it whilst cooling and granulate it again.

The linear saturated polyester of aromatic dicarboxylic acids is preferably polyethylene glycol terephthalate, but other polyesters may also be used, for example polycyclohexane - 1,4 - dimethylol - terephthalate. There are also suitable modified polyethylene terephthalates which contain, in addition to terephthalic acid units, units of other aromatic or aliphatic dicarboxylic acids, for example units of naphthalene-2,6-dicarboxylic acid or adipic acid and/or in addition to ethylene glycol units, units of other aliphatic diols, for example of neopentyl glycol or butane-diol-1,4.

The polyester has a reduced specific viscosity of from 0.6 to 2.0, preferably 0.9–1.0 to 1.4–1.6 dl./g., measured in a 1% solution in a 60:40 mixture of phenol and tetrachloroethane at 25° C.

Polyesters of lower reduced specific viscosity may alternatively be used and the viscosity raised within the preferred range by a post-condensation during the course of the mixing process.

Polyacetals to be used according to the invention are homopolymers and copolymers of cyclic acetals having the following general formula

in which R stands for (a) linear branched or unsaturated alkylene groups containing 2 to 12 carbon atoms or (b) alkylene ether groups such as —CH$_2$—O—CH$_2$— or —CH$_2$—CH$_2$—O—CH$_2$—CH$_2$— which may be contained in the ring one or several times. Especially suitable are homopolymers of ethylene glycol formal, butanediol formal, hexanediol formal, diethylene glycol formal and triethylene glycol formal. It is advantageous to use copolymers or trioxan with cyclic acetals, for example with ethylene glycol formal and butanediol formal.

The polyacetals have a molecular weight in the range of from 1,000 to 250,000, preferably 1,000 to 100,000 and more preferably 1,000 to 50,000.

The amount of polyacetal to be mixed with the polyester depends on the desired properties of the polyester composition. The compositions contain 0.1 to 25 and preferably 0.5 to 10% by weight of polyacetal.

The unstable semi-acetal terminal groups of the polyacetals to be incorporated can be protected against thermal degradation possibly occurring during mixing and processing.

In the case of trioxan this can be done by copolymerizing with epoxides, for example ethylene oxide, and subsequently treating the copolymers in an alkaline medium by a known process. Alternatively, the unstable terminal groups may be blocked in known manner, for example by reacting them with acetic anhydride.

The polyacetal and the polyester can be mixed in various ways, the procedures designated as (a), (b) and (e) being preferred.

(a) The polyester is fused and optionally subjected to a postcondensation under reduced pressure until the desired viscosity has been reached. The polyacetal is then added with vigorous stirring, advantageously in an atmosphere of nitrogen. The melt is optionally stirred under reduced pressure until homogeneous mixing has taken place.

(b) The polyester in the form of powder or granules is mixed as uniformly as possible with the polyacetal, fused in an extruder, extruded whilst cooling and granulated.

(c) The polyester in the form of granules is mixed with the fused polyacetal at elevated temperature in a rotating drum and the mixture is allowed to cool while continuing the rotation of the drum. Further mixing is effected by the screw of the injection moulding machine when the moulding composition is processed into shaped articles.

(d) The polyester is fused together with the polyacetal, appropriately under nitrogen. After fusing the mixture is intensively stirred, optionally under reduced pressure.

(e) The polyester in the form of granules is treated in a rotating drum with a solution of the polyacetal, for example in benzene or toluene and the solvent is evaporated off during rotation. The polyester granules are thus coated with a film of the polyacetal. Mixing is effected by the screw of the injection moulding machine when the polyester composition is processed into shaped articles.

The polyester moulding composition advantageously contains as little moisture as possible, preferably less than 0.01% by weight. In order to keep the moisture uptake low, the granulated polyester moulding composition may be coated with a coating of an inert hydrophobic substance, for example a paraffin or wax.

The polymer mixtures according to the invention may be processed in the thermoplastic state and yield shaped articles which are dimensionally stable and are distinguished by having a considerably improved impact strength.

In order to obtain crystalline or partially crystalline shaped articles it is expedient to mould at a temperature sufficiently above the second order transition temperature of the polyester composition used. The shaped articles obtained from the moulding compositions of the invention are distinguished by a good surface hardness, a good resistance to solvents, a low moisture uptake, and a particularly high impact strength and bending strength.

The following examples serve to illustrate the invention but they are not intended to limit it thereto.

EXAMPLE 1

950 grams of a polyester of terephthalic acid and ethylene glycol having a reduced specific viscosity of 1.40 dl./g., measured in a 1% solution in a 60:40 mixture of phenol and tetrachloroethane, were mixed with 50 grams of polydioxolane having reduced specific viscosity of 2.42 dl./g., measured in benzene at 20° C. the mixture was homogenized in a vertical extruder and granulated.

The granules were subjected to rotation for 2 hours in an atmosphere of nitrogen with 2.0 grams of powdered aluminum silicate (47% $SiO_2$, 38% of $Al_2O_3$, particle size below 2 microns). The mixture was then subjected to rotation for 3 hours at 90° C. with 3.0 grams of paraffin (drop point 56° C.). Sheets of dimensions 60 x 60 x 1 millimeters which had a good dimensional stability were injection moulded from the resulting material at a moulded temperature of 150° C. The impact strength of the sheets was tested by a drop test in which the test sheets were exposed to an impact stress by allowing a falling hammer sliding on low friction tracks to drop vertically from various heights onto a test sheet clamped in a frame. The tip of the dropping hammer represented a hemisphere having a radius $r$ of 10 millimeters. The weight of the hammer was 500 grams. As measurement for the impact strength there was taken the falling height $F_{20}$, that is the height in centimeters at which the impact energy was sufficient to break 20% of the sheets. 10 sheets were tested for each height. The results are summarized in the table.

EXAMPLE 2

900 grams of the polyester specified in Example 1 were suspended while stirring in a solution of 100 grams of polydiethylene glycol formal having a reduced specific viscosity of 1.80 in benzene at 20° C. in 1,000 milliliters of dry benzene and the solvent was evaporated at 50° C. under reduced pressure. When the main quantity of benzene had evaporated, 2.0 grams of aluminum silicate powder were added and the mixture was stirred again for 2 hours under reduced pressure. The mixture was then injection moulded into sheets. The polydiethylene glycol formal was homogeneously mixed with the polyester during injection moulding by the screw of the extruder. The results of the falling test are summarized in the table.

EXAMPLE 3

950 grams of the polyester specified in Example 1 were mixed with 50 grams of a copolymer of trioxan with 35% by weight of dioxolane, the mixture was homogenized in a vertical extruder and granulated. The granules were treated as described in Example 1 with aluminum silicate powder and paraffin and moulded into sheets. The results of the falling test are summarized in the table.

EXAMPLE 4

975 grams of the polyester specified in Example 1 were mixed with 25 grams of a copolymer of trioxan with 40% by weight of butane-diol formal, the mixture was homogenized in an extruder and granulated. The granules were treated as described in Example 1 with aluminum silicate powder and paraffin and moulded into sheets. The results of the falling test are summarized in the table.

TABLE
[Impact strength of mixture of polyacetals with polyethylene terephthalate]

| Polyacetal | Amount added, percent by weight | Falling height, $F_{20}$ in cm.[1] |
|---|---|---|
| | | 50 |
| Polydioxolane (Example 1) | 5.0 | 115 |
| Polydiethlene glycol formal (Example 2) | 10.0 | 150 |
| Trioxan/dioxolane copolymer (Example 3) | 5.0 | 100 |
| Trioxan/butane-diol formal copolymer (Example 4) | 2.5 | 85 |

[1] Height at which the impact energy was sufficient to break 20% of the sheets.

What is claimed is:

1. Thermoplastic molding composition comprising a mixture of
   (a) 99.9 to 75% by weight of a linear saturated polyester of an aromatic dicarboxylic acid with a saturated aliphatic or cycloaliphatic diol, said polyester having a reduced specific viscosity of from 0.6 to 2.0 measured in a 1% solution of a 60:40 mixture of phenol and tetrachloroethane at 25° C.; and
   (b) 0.1 to 25% by weight of a polyacetal selected from the group consisting of (1) a homopolymer of an acyclic acetal of the formula

in which R stands for a linear, branched or unsaturated alkylene group containing 2 12 carbon atoms or one of several alkylene ether groups selected from the group consisting of —$CH_2$—O—$CH_2$— and

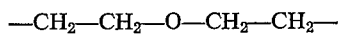

—$CH_2$—$CH_2$—O—$CH_2$—$CH_2$— and (2) a copolymer of trioxane with said cyclic acetal, said polyacetal having a molecular weight in the range of from 1,000 to 250,000.

2. A thermoplastic molding composition as defined in claim 1, wherein the polyester contains, in addition to terephathalic acid units, units of naphthalene-2,6-dicarboxylic acid or adipic acid.

3. A thermoplastic molding composition as defined in claim 1, wherein the polyester contains, in addition to ethylene glycol units, units of neopentyl glycol or butane diol-1,4.

4. A thermoplastic molding composition as defined in claim 1, wherein the polyacetal is a copolymer of trioxan with a cyclic acetal of the formula

in which R is a linear, branched or unsaturated alkylene of 2 to 12 carbon atoms or one or several —CH₂—O—CH₂— or —CH₂—CH₂—O—CH₂—CH₂— groups.

5. A thermoplastic moulding composition as claimed in claim 1, wherein the polyester is polyethylene glycol terephtalate.

6. A thermoplastic moulding composition as claimed in claim 1, wherein the polyester is polycyclohexane-1,4-dimethylol terephthalate.

7. A thermoplastic moulding composition as claimed in claim 1, wherein the polyester contains, in addition to terephthalic acid units, units of naphthalene-2,6-dicarboxlic acid.

8. A thermoplastic moulding composition as claimed in claim 1, wherein the polyester contains, in addition to terephthalic acid units, units of adipic acid.

9. A thermoplastic moulding composition as claimed in claim 1, wherein the polyester contains, in addition to ethylene glycol units, units of neopentyl glycol.

10. A thermoplastic moulding composition as claimed in claim 1, wherein the polyester contains, in addition to ethylene glycol units, units of butane-diol-1,4.

11. A thermoplastic moulding composition as claimed in claim 1, wherein the polyester has a reduced specific viscosity of from 0.9–1.0 to 1.4 to 1.6, measured in a 1% solution in a 60:40 mixture of phenol and tetrachloroethane at 25° C.

12. A thermoplastic molding composition as defined in claim 1, wherein the polyacetal is a homopolymer of a cyclic acetal of the formula

in which R stands for linear, branched or unsaturated alkylene group containing 2 to 12 carbon atoms or one or several alkylene ether selected from the group consisting of —CH₂—O—CH₂— and

—CH₂—CH₂—O—CH₂—CH₂—.

13. A thermoplastic moulding composition as claimed in claim 1, wherein the cyclic acetal units of the polyacetals contain alkylene ether groups of the formula —CH₂—O—CH₂— or —CH₂CH₂OCH₂CH₂— which may be contained in the ring one or several times.

14. A thermoplastic moulding composition as claimed in claim 1, wherein the polyacetal is a homopolymer of ethylene glycol formal, butanediol formal, hexanediol formal, diethylene glycol formal or triethylene glycol formal.

15. A thermoplastic moulding composition as claimed in claim 1, wherein the polyacetal is a copolymer of trioxan with ethylene glycol formal or butanediol formal.

16. A thermoplastic moulding composition as claimed in claim 1, wherein the polyacetal has a molecular weight of from 1,000 to 100,000.

17. A thermoplastic moulding composition as claimed in claim 1, wherein the polyacetal has a molecular weight of from 1,000 to 50,000.

18. A thermoplastic moulding composition as claimed in claim 1, containing of from 0.5 to 10% by weight polyacetal, calculated on the total mixture.

19. A thermoplastic moulding composition as claimed in claim 1, wherein the semiacetal terminal groups in the polyacetal are stabilized.

20. A thermoplastic moulding composition as claimed in claim 1, wherein a finely divided inorganic substance is added as nucleating agent.

21. Shaped articles made from the thermoplastic moulding compositions claimed in claim 1.

References Cited

UNITED STATES PATENTS

| 2,716.095 | 8/1955 | Stanton et al. | 260—45.7 |
| 3,227,670 | 1/1966 | Regan | 260—45.7 |
| 3,373,160 | 3/1968 | Ikeda | 260—860 |

FOREIGN PATENTS

| 944,629 | 12/1963 | Great Britain | 260—873 |
| 6,511,744 | 2/1967 | Netherlands | 260—75 |

WILLIAM H. SHORT, Primary Examiner

E. WOODBERRY, Assistant Examiner

U.S. Cl. X.R.

260—45.7, 45.8, 33.2, 67